United States Patent [19]

Tangorra

[11] Patent Number: 4,568,320
[45] Date of Patent: Feb. 4, 1986

[54] DRIVING-BELT PULLEY

[75] Inventor: Giorgio Tangorra, Monza, Italy

[73] Assignee: Industrie Pirelli S.p.A., Milan, Italy

[21] Appl. No.: 610,602

[22] Filed: May 15, 1984

[30] Foreign Application Priority Data

May 19, 1983 [IT] Italy ................. 21174 A/83

[51] Int. Cl.⁴ .................. F16H 55/30; F16H 7/02
[52] U.S. Cl. .................... 474/152; 474/153; 198/834
[58] Field of Search ............ 474/152, 153, 202–205; 198/834

[56] References Cited

U.S. PATENT DOCUMENTS

| | | | |
|---|---|---|---|
| 13,213 | 6/1898 | Harper | 474/153 |
| 24,874 | 11/1908 | Jones et al. | 474/153 |
| 1,144,414 | 6/1915 | Holmes | 474/153 X |
| 1,482,896 | 2/1924 | Huntington et al. | 474/152 |
| 3,642,120 | 2/1972 | Duhan | 198/834 |
| 3,812,953 | 5/1974 | Maschke | 198/834 |

Primary Examiner—Stephen J. Novosad
Assistant Examiner—Thuy M. Bui
Attorney, Agent, or Firm—Stevens, Davis, Miller & Mosher

[57] ABSTRACT

A driving belt pulley provided with dowels protruding in the radial direction with respect to its axis, and adapted for insertion into corresponding holes in the belt itself. The belt pulley comprises a supporting surface for the belt, the width of which—measured in the direction of said axis—is between two and four times the dimension of the root-section of one of said dowels measured in the direction of said axis, while the dimension of the root-section of each one of said dowels measured in the direction orthogonal to the previous one is between 3/10 and 8/10 of the distance between the axes of two of said contiguous dowels measured in respect of their root-section.

12 Claims, 14 Drawing Figures

DRIVING-BELT PULLEY

DESCRIPTION

The present invention relates to a driving belt pulley of the type provided with dowels protruding in the radial direction with respect to its axis, and predisposed for insertion into corresponding holes in the belt itself.

The known belt pulleys of this type have presented certain drawbacks. First and foremost, they cannot be utilized in connection with transmission belts intended for providing transmissions capable of transmitting high torques. As a matter of fact, both the dimensions as well as the form of the various parts of said pulleys do not permit any utilization of driving belts by which it is possible to realize a correct passage of the flow of tensions, as exchanged between each dowel and the belt, towards the two annular beads of the belt that are disposed on either side of the dowels themselves. In fact, owing to these dimensions and forms when in the presence of high torques, abnormal deformations are produced in the belt parts and, in particular, in those bridging-spaces of material that lie between two contiguous holes in the belt itself; or else ruptures are caused in the belt in the region of the above-said annular bands.

Besides this, each dowel tends to apply a pressure to the belt part upon which it rests, the resultant of which is a part sensibly inclined with respect to a plane tangent to the supporting surface of the belt, and it hence presents a rather high radial component. Said radial component can easily give rise to abnormal deformations in the belting material, and the "skipping" phenomena during the meshing between dowel and hole.

Moreover, with the known belt pulleys of the type described, the meshing between each dowel and its relative hole in the belt does not take place smoothly and regularly, with the consequence of producing abnormal stress-strains in the belt, and moreover, noises that prove to be particularly troublesome when the belt functions at very high speeds.

Finally, some belt pulleys of the type described only allow for transmissions of power wherein the mid-plane of the pulleys is substantially contained in the same plane, and wherein the belt pulleys are fitted together on parallel axes. As a matter of fact, whenever the mid-planes of these pulleys are not coincident, or should the pulleys be fitted together on slanting axes, irregularities occur in the transmission of power and abnormal strain-stresses occur on the belt itself, causing the belt to rupture rapidly.

The aim of the present invention is to realize a belt pulley of the type described but which is devoid of the previously-mentioned drawbacks and which, therefore, can be utilized for transmitting high couples; that allows for a transmission of movement with regularity and smoothness without troublesome noises, and which can be inserted into a transmission where the belt pulleys are disposed on diverse planes or fitted together on slanting axes.

On the basis of the present invention, there is provided a pulley for a driving belt provided with dowels, projecting in the radial direction with respect to the axis of the pulley, and which are adapted for insertion into corresponding holes in said belt, characterized in that it comprises a supporting surface for the belt, the width of which, measured in the direction of said axis, is between twice and four times the dimension of the root-section of each one of said dowels, measured in the direction of said axis, the dimension of the root-section of each of said dowels, measured in the direction orthogonal to the previous one, being between 3/10 and 8/10 of the distance between the axes of two of said contiguous dowels, measured in respect of their root-section.

For convenience, each one of said dowels is laterally circumscribed by a surface-of-revolution, the generatrix-curve of which is constituted by a circumferential arc having a radius between 15/100 and 45/100 of the radius of the pulley. According to an alternative solution of construction, each one of said dowels is laterally circumscribed by a surface-of-revolution, the generatrix-curve of which is constituted by at least two circumferential arcs, the centers of which lie on opposite sides with respect to said curve, whereby the curve itself will present a flex point.

For aiding in a still better understanding of the present invention, there will now be given, solely by way of example, a description of some of its particular forms of realization, with reference to the attached drawings, wherein:

FIG. 1 schematically shows the pulley of the present invention when it is meshed with a driving belt provided with holes;

Figure 1:
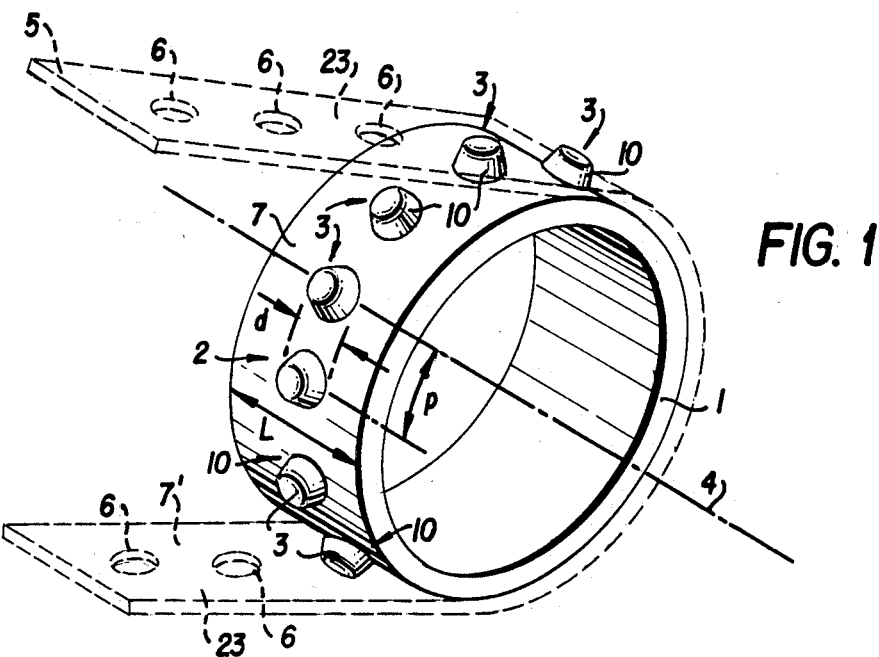
Figure 4:
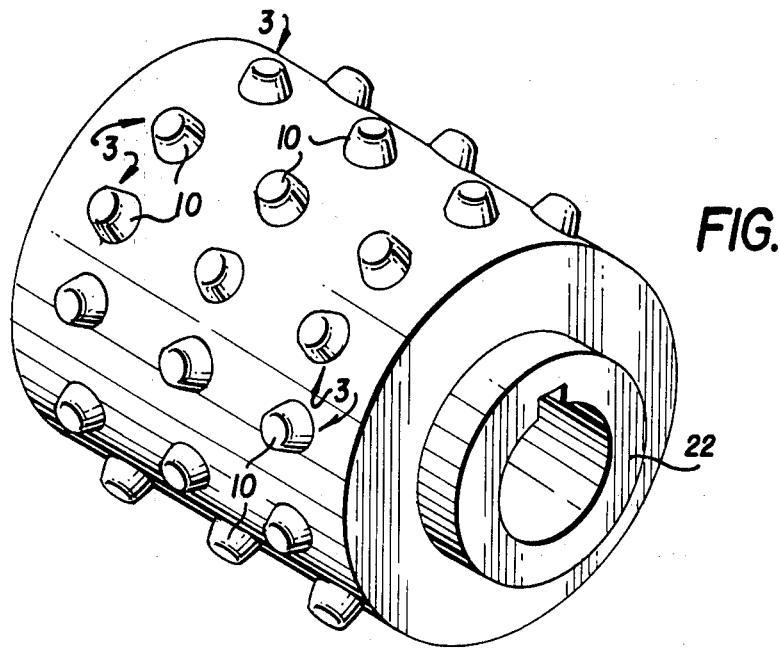
Figure 9:
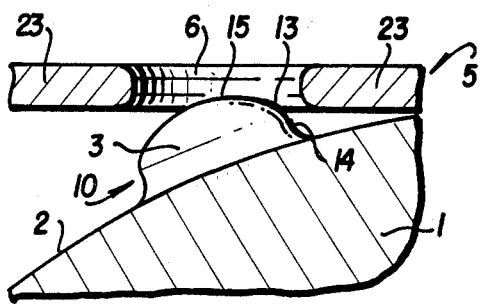
Figure 10:
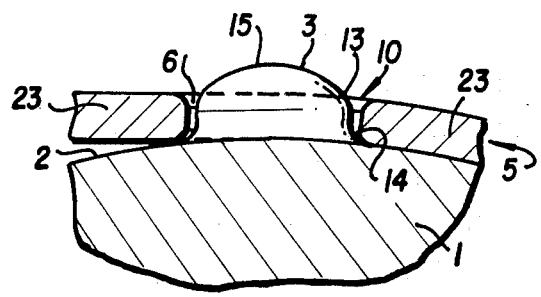
Figure 11:
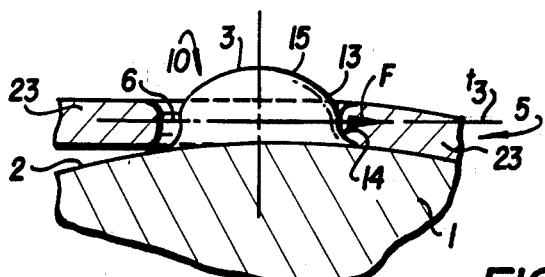
Figure 14:
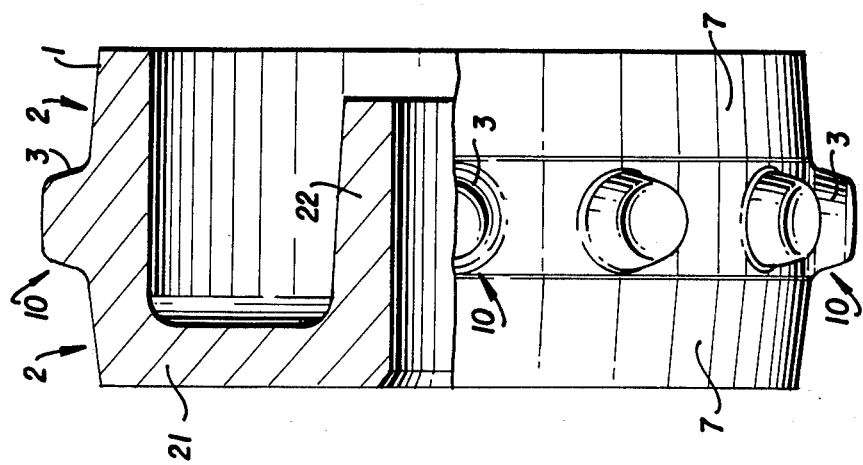
Figure 13:
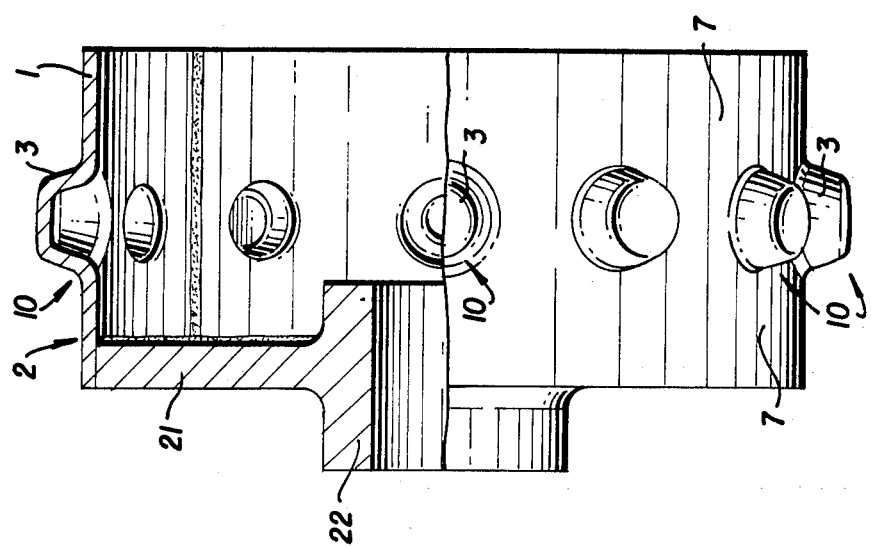
Figure 12:
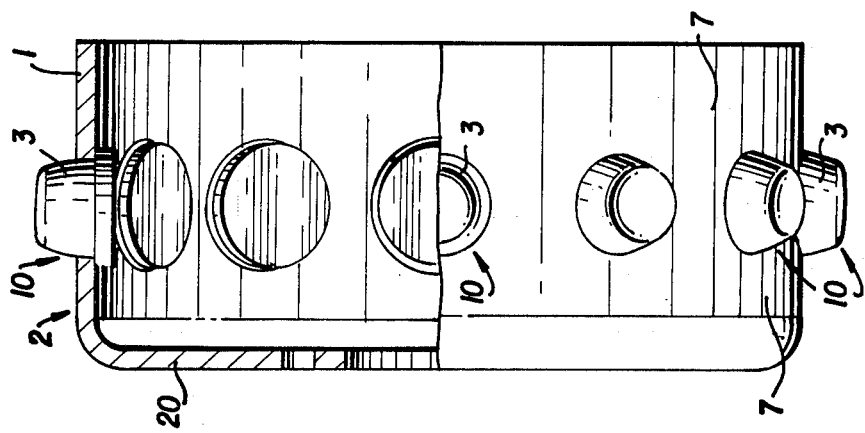

FIG. 4 schematically shows the pulley of the invention corresponding to a different embodiment from that of FIG. 1;

FIGS. 5 to 8 show generator profiles of the dowels with which the pulley of this invention is provided;

FIGS. 9 to 11 schematically show diverse configurations during the meshing between belt and pulley; and FIGS. 12 to 14 show the different embodiments of construction for the pulley according to this invention.

The pulley of this invention substantially comprises a cylindrical band 1, provided with a supporting surface 2 for the belt, from which the dowels 3 protrude radially. See FIG. 1. The pulley comprises other per se known parts, having any appropriate form whatsoever and adapted for connecting the band 1 to the rotation axis 4 with which the pulley itself is made fast. The pulley may quite conveniently form a part of a transmission comprising a driving belt 5 having a substantially rectangular cross-section and provided with a plurality of holes 6, each one of which is adapted for coupling with a corresponding dowel 3 on the pulley.

The supporting surface 2 for the belt presents a width L, measured in the direction of the axis 4, that is between two and four times the dimension of the root-section of the dowels 3, measured in the direction of the above-said axis. When the section of each dowel is circular, which is preferred, then the width l is between two and four times the diameter d of the base section of the dowel.

When the ratio between the diameter d and the width l is within the previously indicated range, then on the supporting surface 2 of the pulley two bands 7 are defined (and which are disposed on opposite sides with respect to the row of dowels 3) having dimensions which are sufficient for allowing the optimum utilization of the belt, whereby the flow of tensions is conveyed in a correct manner (explained below) from each contact zone between dowel and belt to the belt parts that lie on the above-said bands.

The dimension of the root-section of each one of said dowels (equal to the diameter d when said section is circular), measured in the direction orthogonal to the previous direction, is between 3/10 and 8/10 of the measured distance p between the axes of two contiguous dowels, corresponding to their root-section, as shown in FIG. 1. The selection of the ratio between the diameter d and the distance p, in the previously indicated range, allows for the optimum utilization of the driving belt 5, wherein the material between the two dowels does not undergo any appreciable deformations, and thus correctly maintains the meshing between dowels and holes.

Figure 2:
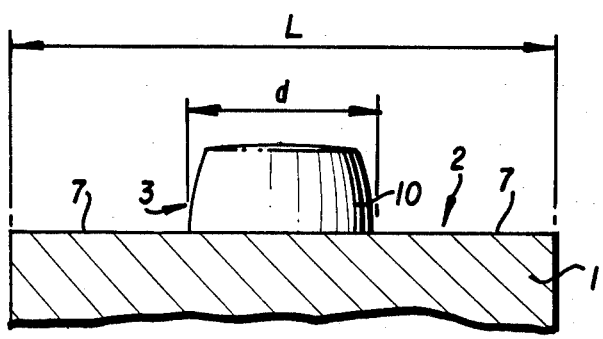
FIG. 2 shows a partial cross-section of the pulley of FIG. 1 made on a diametrical plane.
Figure 3:
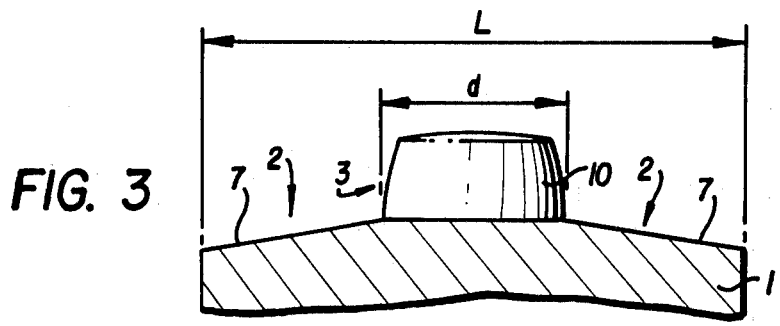
FIG. 3 is a similar partial cross-section as that of FIG. 2, but of a slightly different pulley.

The surface 2 of the pulley may be cylindrical, as shown in FIG. 2; or else it can be slightly cambered, as shown in FIG. 3.

Figure 5:
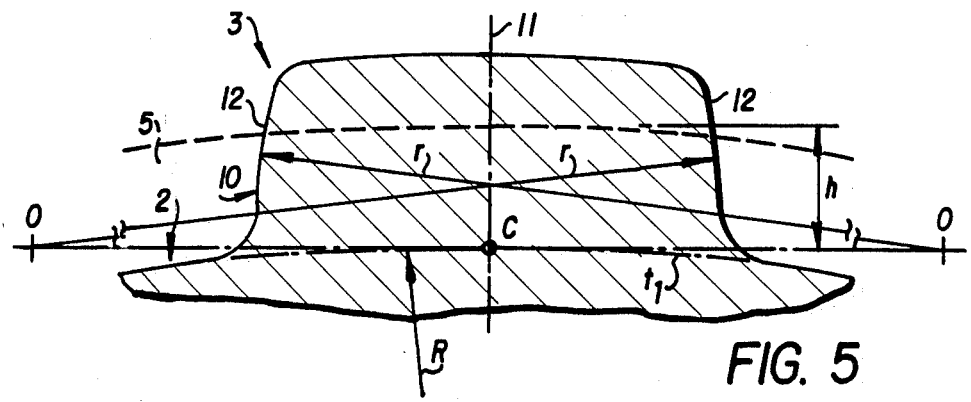

Each dowel 3 is preferably circumscribed by a surface of revolution 10 that may be obtained by causing a predetermined generatrix-curve to rotate about the axis 11 of the dowel itself (FIG. 5). On the basis of a first form of realization, as illustrated in FIG. 5, the above-said generatrix-curve is constituted by a circumferential arc, the radius r of which is between 15/100 and 45/100 of the radius R of the pulley. Each dowel is also circumscribed outwardly by a portion of a cylindrical surface that is approximately connected to the above-said surface of revolution 10. For convenience, that height of each dowel is slightly higher than the thickness h of the belt, as shown in FIG. 5. For convenience, said height of the dowel is equal to one and one-half times the thickness h of the belt.

The centers O of the circumferential-arcs 12 are on the straight line t1 that is tangent to the circumference, obtained by intersecting the supporting surface 5 of the belt with the equatorial plane of the pulley, and which intersects the axis 11 of the dowel at C.

Figure 6:
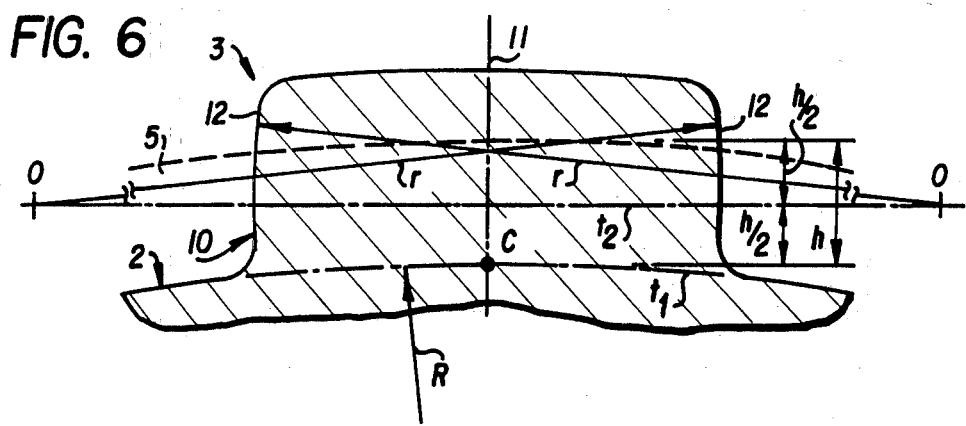

According to another form of the invention shown in FIG. 6, the surface-of-revolution 10 that laterally delimits each dowel is obtained from a generatrix-curve 12, also constituted by a circumferential arc, the radius of which is within the previously indicated range; but the position of the centers O of said arcs is different from that shown in FIG. 5. In this embodiment, these centers are positioned on the straight line t2 that is spaced apart, by a distance equal to half the thickness h of the belt, from the previously defined straight line t1.

Figure 8:
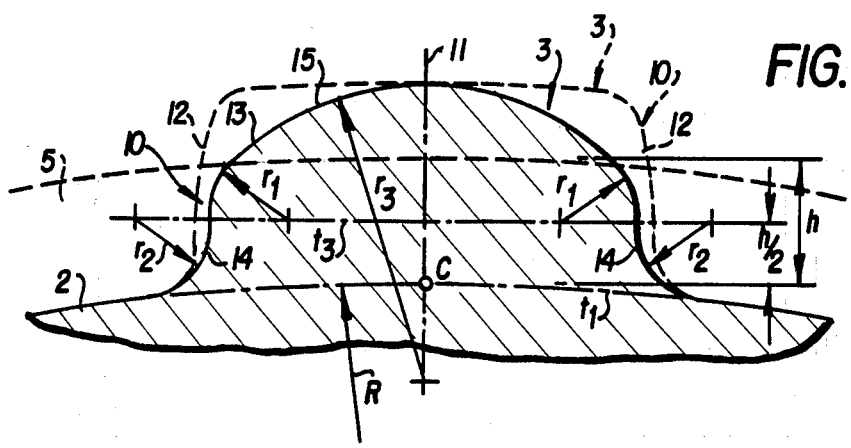

In still another embodiment, the surface of revolution 10 of each dowel 3, as shown in FIG. 8, where the generatrix-curve of this surface is constituted by two superimposed circumferential arcs 13 and 14, the centers of which lie on the opposite sides with respect to the curve itself, and in such a way that the curve will present a flex point. The said centers lie on the same straight line t3 orthogonal to the axis 11 of the dowel, and the radii r1 and r2 are equal to each other. For convenience, the distance of the flex point, and hence of the straight line t3, from the straight line t1 (that passes through the intersection point C), is equal substantially to half the thickness h of the belt, as has been indicated clearly in FIG. 8.

The generatrix-curve adapted for generating the lateral surface of the dowel of FIG. 8, for convenience, comprises a third circumferential arc 15 of radius r3, which is adapted for generating that portion of the surface of revolution which upwardly delimits the dowel itself. The generatrix-curve thus obtained, comprising the circumferential arcs of radius r1, r2 and r3, lies inside the generator profile 12 (FIG. 8) of the dowel surface, as is illustrated in FIG. 5. Said profile is indicated with broken lines in FIG. 8.

Figure 7:
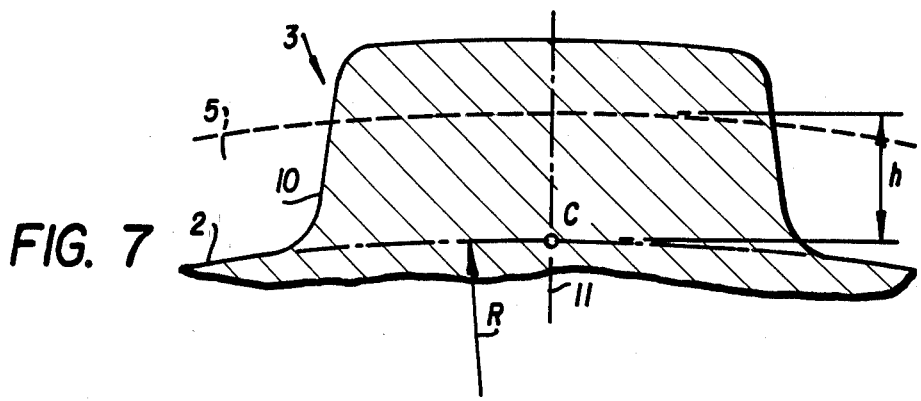

Each dowel 10 may also be circumscribed by a conical lateral surface, as shown in FIG. 7.

The pulley of the invention may comprise several series of dowels disposed on different parallel planes, as shown in FIG. 4. Said pulley, having several series of dowels, may substantially be thought of as having been obtained through the placing together of several elementary pulleys of the type shown in FIG. 1.

The pulley of the invention may be constructed in any convenient way. In FIGS. 12 to 14 are shown three different forms of pulley, which differ one from the other because of the way in which the band 1 and the dowels 3 have been constructed and arranged, and because of the way in which the parts that connect the band itself to the axis 4 are constructed.

In the form shown in FIG. 12, the band 1 is constructed out of plate and in one piece, with a disc part 20 that is adapted for connection to a hub (not shown). Each dowel 3, constructed by drilling or milling or through plastic deformation, is inserted into a corresponding hole made in the band 1, and it is fixed thereto for example by means of welding.

In the form of realization of FIG. 13, the band 1, constructed also out of plate, is connected to a part of a disc 21 with a hub 22. Each dowel 3, as can clearly be seen in FIG. 13, is obtained through the operation of "drawing" the material of the band 1.

In the form shown in FIG. 14, the pulley is obtained by the technique of pressing and injection molding by utilizing a plastic material. Therefore, here the entire pulley is of one-piece construction.

The functioning during use of the pulley of the present invention is as follows:

During the meshing between dowels 3 and holes 6 of the driving belt 5, pressures are transmitted between the first and second of these, which must be conveyed towards the belt bands 7' (FIG. 1) that are disposed on either side of the holes 6, and without any abnormal deformations being produced in the belt, nor with the geometrical meshing conditions being altered.

If the pulley dimensions are selected in the previously indicated way, a regular flow of pressures is had from the contact zone to the belt bands 7', and hence no abnormal deformations are produced; neither are the geometrical conditions of the meshing altered even in the presence of rather high couples. Moreover, there is obtained a considerable smoothness and regularity in the meshing and a complete absence of noise—even at considerably high speeds. This is achieved above all, thanks to the form of the surface 10 that laterally delimits each dowel 3 selected from one of the previously indicated forms. Thereupon, during the transmission of the couple, the forces transmitted between dowel and belt do not give rise to any components with a radial direction—which moreover might tend to alter the meshing conditions. This becomes clear upon examining FIGS. 9 to 11, which show three relative positions between dowel and belt during the meshing thereof.

FIG. 9 corresponds to the start of the meshing between the dowel (having the profile shown in FIG. 8) and the belt. As clearly shown, the surface part generated by the circumferential arc 15 (FIG. 8) is notably radiused to the remaining part of the surface that delimits the dowel, in such a way as to considerably facilitate the meshing.

FIG. 10 corresponds to the relative position, between belt and dowel, at the end of the meshing and whenever the belt does not yet have to transmit any couple.

FIG. 11 corresponds to the application of a rather high couple. As can clearly be seen in said FIG. 11, the lateral surface part of the dowel generated by the circumferential arc 14 (FIG. 8) constitutes an abundant tooth fillet well adapted for improving the resting condition with the bridge 23 of the belt 5. When, as between dowel and bridge 23, high pressures are interchanged, the surface material of the latter becomes deformed, with substantial assumption of the form of the lateral surface 10 that laterally circumscribes the dowel itself, clearly shown in FIG. 11. Since the flex point of the generatrix-curve of the lateral surface of the dowel is substantially half-way up the belt height, in correspondence of this point itself, as can be imagined, there is applied the resultant F of the above-said pressures. Since this resultant is perpendicular to the coupling surfaces, it passes through the straight line t3 (FIG. 8) and hence is orthogonal to the axis 11 of the dowel. In this manner, only tangential forces are transmitted between dowel and the relative bridge 23.

The favorable force-transmission properties just described, which are obtained with dowels having their profile corresponding to that of FIG. 8, may also be had with dowels having the profiles shown in the other figures.

What is claimed is:

1. A pulley for driving a belt of the type comprising a plurality of holes separated by bridge portions, said pulley comprising a plurality of dowels protruding in a radial direction with respect to an axis of said pulley and adapted for being inserted into corresponding said holes in said belt and for interchanging pressures with said bridge portions of said belt, said pulley comprising a supporting surface for the belt, said supporting surface having a predetermined radius, a width of said supporting surface, measured in a first direction substantially parallel to said axis, being between two and four times a dimension of a root-section of one of said dowels, said dimension of said root-section being measured in a direction substantially parallel to said axis, a dimension of the root-section of each of said dowels, measured in a second direction substantially orthogonal to said first direction, being between 3/10 and 8/10 of a distance between axes of two contiguous said dowels, measured in respect of their root-section, each of said dowels being delimited laterally by a lateral surface of revolution, a generatrix-curve of which is constituted by a circumferential arc whose radius is of a lesser value than said radius of said supporting surface, each lateral surface of each dowel being radiused to a pulley surface at which said said belt rests.

2. A pulley according to claim 1, characterized in that each of said dowels is delimited laterally by a surface of revolution, a generatrix-curve of which is constituted by a circumferential arc whose radius is between 15/100 and 45/100 of a radius of the pulley.

3. A pulley according to claim 2, characterized in that a center of said circumferential arc is positioned on a straight line that is tangent to a circumference obtained by intersecting said supporting surface for the belt with an equatorial plane of the pulley, and which passes through the axis of a respective said dowel.

4. A pulley according to claim 1 or 2, characterized in that the center of said circumferential arc is positioned on a straight line that lies apart, by a distance equal to half the thickness of said belt, from the straight line that is tangent to the circumference obtained by intersecting said supporting surface for the belt with the equatorial plane of the pulley and which passes through the dowel axis.

5. A pulley according to claim 1, characterized in that each one of said dowels is laterally delimited by a surface-of-revolution, the generatrix curve of which is constituted by at least two circumferential arcs whose centers lie on opposite sides with respect to said curve, in such a way that the curve will present a flex point.

6. A pulley according to claim 5, characterized in that said two centers lie on a straight line, orthogonal to the axis of the dowel, and that said two radii are equal to each other.

7. A pulley according to claim 5 or 6, characterized in that in a section made by an equatorial plane of the pulley the distance of the flex point of said pulley is equal substantially to half the thickness of the belt that is coupled with the pulley.

8. A pulley according to claim 5 or 6, characterized in that said generatrix curve comprises a third circumferential arc generating the portion of the surface-of-revolution that delimits the dowel upwardly.

9. A pulley according to claim 1, characterized in that the intersection of said supporting surface of the belt, with a diametrical plane of said surface, is curved.

10. A pulley according to claim 1, comprising a disc-shaped part connected to a cylindrical band, characterized in that said band is provided with holes into which said dowels are inserted.

11. A pulley according to claim 1, comprising a disc-shaped part connected to a cylindrical band, characterized in that said band is constructed out of plate, and that said dowels are obtained by means of "drawing" the said plate.

12. A pulley according to claim 1, comprising a disc-shaped part and plastic material cylindrical band, characterized in that on said band said dowels are made in a single piece with the disc part and the cylindrical band.

* * * * *